US009294209B2

(12) United States Patent
Kim et al.

(10) Patent No.: US 9,294,209 B2

(45) Date of Patent: Mar. 22, 2016

(54) DEVICE AND METHOD FOR TRANSMITTING MULTIPLEXED DATA FRAME

(71) Applicant: Electronics and Telecommunications Research Institute, Daejeon (KR)

(72) Inventors: Pan Soo Kim, Daejeon (KR); Deock Gil Oh, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 56 days.

(21) Appl. No.: 14/373,612

(22) PCT Filed: Jan. 18, 2013

(86) PCT No.: PCT/KR2013/000383
§ 371 (c)(1),
(2) Date: Jul. 21, 2014

(87) PCT Pub. No.: WO2013/109075
PCT Pub. Date: Jul. 25, 2013

(65) Prior Publication Data

US 2015/0009882 A1 Jan. 8, 2015

(30) Foreign Application Priority Data

Jan. 20, 2012 (KR) ........................ 10-2012-0006718
Jan. 15, 2013 (KR) ........................ 10-2013-0004459

(51) Int. Cl.

| | |
|---|---|
| ***H04B 7/00*** | (2006.01) |
| ***H04H 20/71*** | (2008.01) |
| ***H04B 7/185*** | (2006.01) |
| ***H04W 4/00*** | (2009.01) |
| ***H04H 60/02*** | (2008.01) |
| ***H04H 20/74*** | (2008.01) |

(52) U.S. Cl.
CPC ............... *H04H 60/02* (2013.01); *H04H 20/74* (2013.01)

(58) Field of Classification Search
CPC ........ H04B 7/26; H04B 7/2656; H04H 20/74; H04H 60/02; H04J 3/02; H04J 3/16; H04J 3/1694
USPC .................................................. 370/310–350
See application file for complete search history.

(56) References Cited

U.S. PATENT DOCUMENTS 8,098,741 B2 * 1/2012 Suh ........................ H04H 20/30 375/240.27
8,254,303 B2 * 8/2012 Becker .............. H04B 7/18582 370/315

(Continued)

FOREIGN PATENT DOCUMENTS

KR 10-2005-0066975 A 6/2005
WO 2010-128621 A1 11/2010

OTHER PUBLICATIONS

H.S. Lim, et al., Standardization Trends of Terrestrial Digital Television, Apr. 2010, No. 2, vol. 25, Analysis of Electronic Communication Trend, ETRI.

(Continued)

*Primary Examiner* — Tri H Phan
(74) *Attorney, Agent, or Firm* — William Park & Associates Ltd.

(57) ABSTRACT

An apparatus and method for transmitting, through multiplexing a data frame that generates at least one super frame including at least one slice configured in a unit of a plurality of PLframes, generates a multiplexing super frame by rotating the at least one super frame by a predetermined phase value, and transmits the at least one super frame is provided.

18 Claims, 9 Drawing Sheets

(56) References Cited

U.S. PATENT DOCUMENTS

| | | | | |
|---|---|---|---|---|
| 2006/0203950 | A1* | 9/2006 | Chung | H03J 1/0083 375/376 |
| 2006/0215778 | A1* | 9/2006 | Murthy | G06F 1/0353 375/260 |
| 2006/0239181 | A1 | 10/2006 | Hosur | |
| 2009/0034556 | A1* | 2/2009 | Song | H04W 24/02 370/471 |
| 2013/0235952 | A1* | 9/2013 | Ko | H04H 20/42 375/295 |
| 2013/0279380 | A1* | 10/2013 | Hong | H04H 20/72 370/310 |

OTHER PUBLICATIONS

Digital Video Broadcasting (DVB); Second generation framing structure, channel coding and modulation systems for Broadcasting, Interactive Services, News Gathering and other broadband satellite applications (DVB-S2), Aug. 2009, ETSI EN 302 307 v1.2.1, European Standard (Telecommunications series).

A Study on the Trends of the Enhancement of Digital Terrestrial Televsision,Dec. 2008, KORPA.

* cited by examiner

DEVICE AND METHOD FOR TRANSMITTING MULTIPLEXED DATA FRAME

TECHNICAL FIELD

The present invention relates to an apparatus and method for transmitting through multiplexing a frame efficiently in order to transmit a wideband signal in a digital video broadcasting-satellite-second generation (DVB-S2) transmission.

BACKGROUND ART

Satellite broadcasting/satellite communication technology based on a general digital video broadcasting-satellite-second generation (DVB-S2) standard transmits data to a single carrier usually matching 36 megahertz (MHz) of a Ku band. However, a recently launched Ka band repeater has a bandwidth greater than 200 MHz.

Accordingly, 36 MHz may be divided into a plurality of bands to transmit data. In this instance, the transmission of the data may be performed by setting several guard bands due to adjacent channel interruption, and the like, when a satellite repeater is amplified, or by transmitting data through backing off the repeater.

Technology for transmitting a signal having a single carrier frequency, in an ultra wideband, in order to avoid such a phenomenon when the satellite repeater is amplified, is garnering attention. In this instance, a high symbol speed of the technology may increase a complexity of a receiver.

Furthermore, technology for transmitting data based on time slicing is also garnering attention in recent times.

A time slicing technique, being introduced from a digital video broadcasting-handheld (DVB-H) standard, may refer to a technique for reducing power consumption by performing demodulation only on data viewed, or received, by an end user without performing the demodulation on irrelevant data.

Accordingly, there is a desire for technology that does not require a change of standard or require a minimum change of standard to provide a backward compatibility of existing DVB-S2 standard users so as to implement the time slicing technique.

DISCLOSURE OF INVENTION

Technical Goals

Example embodiments provide an apparatus and method for transmitting, through multiplexing a frame in order to receive an ultra wideband signal in a satellite communication and broadcasting system based on a digital video broadcasting-satellite-second generation (DVB-S2) standard.

Example embodiments also provide a system that transmits a data frame efficiently, in an ultra wideband transmission, in a satellite communication broadcasting transmission system without increasing complexity of a receiver.

Technical Solutions

According to an aspect of the present invention, there is provided an apparatus for transmitting through multiplexing a data frame, the apparatus including a frame generating unit to generate at least one super frame including at least one slice in a unit of a plurality of PLframes, and a transmitting unit to transmit the at least one super frame, wherein the frame generating unit generates a multiplexing super frame by rotating the at least one super frame by a predetermined phase value.

The apparatus for transmitting through multiplexing the data frame may further include a mapping unit to map any one of the at least one slice and service information.

At least one of the plurality of PLframes may include data information about a single input stream.

The at least one super frame may include an anchor slice, in a form of an initial start frame.

The frame generating unit may generate the anchor slice by phase modulating a start of frame (SOF) symbol of the at least one super frame.

The frame generating unit may determine a phase rotation period of the at least one super frame, based on the anchor slice.

The frame generating unit may generate the multiplexing super frame by rotating the at least one super frame once per the phase rotation period.

The frame generating unit may generate the multiplexing super frame by rotating a total phase with respect to the at least one super frame.

According to an aspect of the present invention, there is provided a method for transmitting a multiplexing a data frame, the method including generating at least one super frame including at least one slice in a unit of a plurality of PLframes, generating a multiplexing super frame by rotating the at least one super frame by a predetermined phase value, and transmitting the multiplexing super frame.

Effects of Invention

According to an embodiment of the present invention, it is possible to receive an ultra wideband signal in a satellite communication and broadcasting system based on a digital video broadcasting-satellite-second generation (DVB-S2) standard.

According to an embodiment of the present invention, it is possible to implement a system that transmits a data frame efficiently, in an ultra wideband transmission, in a satellite communication broadcasting transmission system without increasing complexity of a receiver.

BEST MODE FOR CARRYING OUT THE INVENTION

Figure 1:
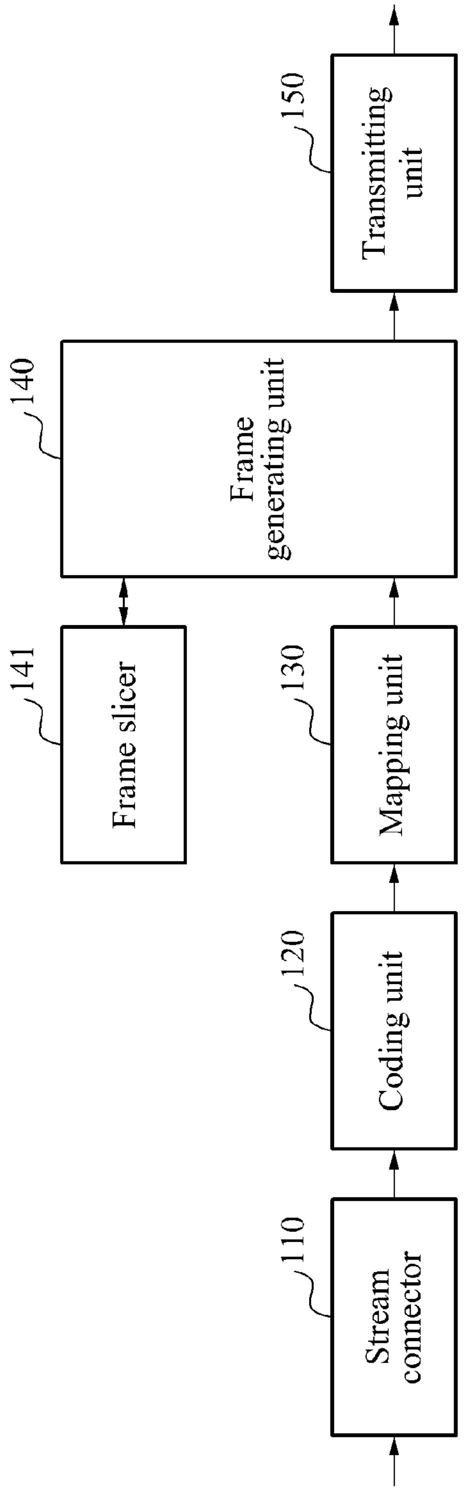
FIG. 1 is a block diagram illustrating a configuration of an apparatus for transmitting, through multiplexing a data frame according to an embodiment of the present invention.

Reference will now be made in detail to embodiments of the present invention, examples of which are illustrated in the accompanying drawings, wherein like reference numerals refer to the like elements throughout. The embodiments are described below in order to explain the present invention by referring to the figures.

When it is determined that a detailed description related to a related known function or configuration which may make the purpose of the present invention unnecessarily ambiguous in the description of the present invention, such detailed description will be omitted. Also, terminologies used herein are defined to appropriately describe the exemplary embodiments of the present invention and thus may be changed depending on a user, the intent of an operator, or a custom. Accordingly, the terminologies must be defined based on the following overall description of this specification.

FIG. 1 is a block diagram illustrating a configuration of an apparatus for transmitting through multiplexing a data frame according to an embodiment of the present invention.

Referring to FIG. 1, the apparatus for transmitting through multiplexing the data frame may include a frame generating unit 140 and a transmitting unit 150.

The frame generating unit 140 may generate at least one super frame including at least one slice configured in a unit of a plurality of PLframes. The transmitting unit 150 may transmit the at least one super frame. In this instance, the frame generating unit 140 may generate a multiplexing super frame by rotating the at least one super frame by a predetermined phase value. The transmitting unit 150 may transmit the multiplexing super frame generated. The frame generating unit 140 may distinguish the at least one slice configured in the unit of the plurality of PLframes, using a frame slicer 141.

The apparatus for transmitting through multiplexing the data frame may further include a stream connector 110, a coding unit 120, and a mapping unit 130.

The stream connector 110 may receive and transfer a single stream or a plurality of streams to the coding unit 120, and the coding unit 120 may provide the received single stream or the plurality of streams to the mapping unit 130 by coding. The mapping unit 130 may map any one of the at least one slice and service information (SI). Here, at least one of the plurality of PLframes may include data information about a single input stream.

Figure 2:
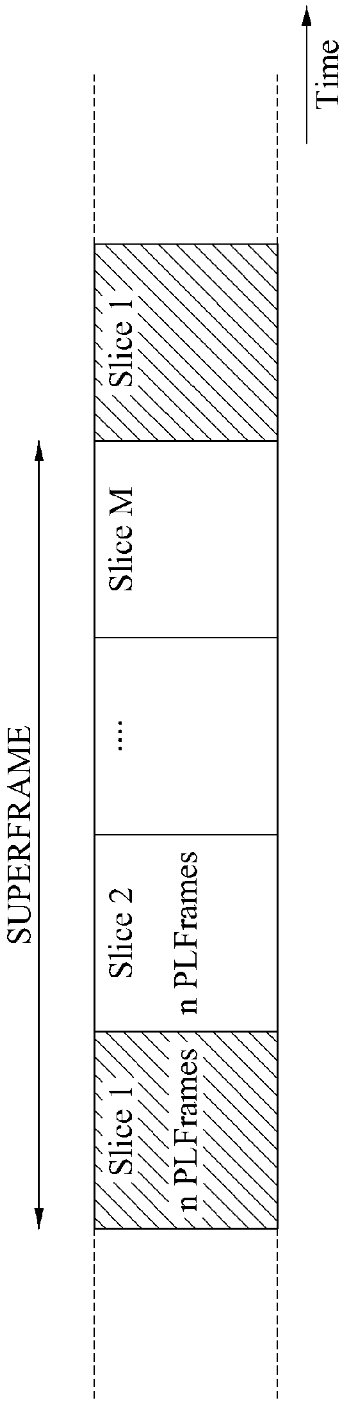
FIG. 2 is a diagram illustrating a configuration of a super frame according to an embodiment of the present invention.

FIG. 2 is a diagram illustrating a configuration of a super frame according to an embodiment of the present invention.

Referring to FIGS. 1 and 2, the frame generating unit 140 may configure a super frame including a slice in a unit of a single PLframe or a plurality of PLframes.

A predetermined slice may be mapped with a predetermined program, or a service, and a predetermined PLframe may include data information about a single input stream.

A single slice may be configured by an "n" number of PLframes, or an "n" number of PLheaders, "n" being an integer greater than 1, to support an adaptive coding and modulation (ACM) or a variable coding and modulation (VCM) as shown in FIG. 2. For example, "n=2" may correspond to Quadrature Phase Shift Keying (QPSK), "n=3" may correspond to 8 Phase-shift keying (8PSK), "n=4" may correspond to 16 Amplitude and Phase-shift keying (16APSK), and "n=5" may correspond to 32APSK.

A new time-slice-receiver (TS-RX) may perform decoding of a PLsync and PLheader at a full speed. In an instance of a short frame, "n" may be increased to be four times greater.

According to an embodiment of the present invention, the at least one super frame may include an anchor slice, in a form of an initial start frame.

Figure 3:
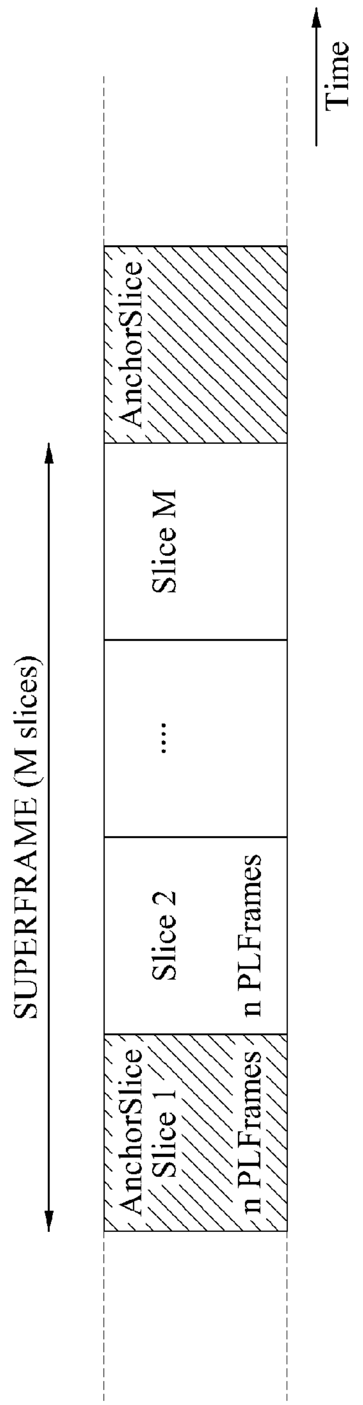
FIG. 3 is a diagram illustrating an example of a super frame including an anchor slice according to an embodiment of the present invention.

FIG. 3 is a diagram illustrating an example of a super frame including an anchor slice according to an embodiment of the present invention.

Referring to FIGS. 1 and 3, the frame generating unit 140 may generate an anchor slice by phase demodulating a start of frame (SOF) symbol of at least one super frame.

The frame generating unit 140 may determine a phase rotation period of the at least one super frame, based on the anchor slice. For example, an initial start frame of a super frame may refer to an anchor slice, and set a period of a super frame to be an "M" number of slices as shown in FIG. 3.

For example, 90 symbols of PLheaders may exist as an SOF and a physical layer signaling code (PLSCODE) when an apparatus for transmitting through multiplexing a data frame is applied to the DVB-S2 standard. A configuration of the symbols may correspond to Equation 1.

$$I_{.2i-1}=Q_{.2i-1}=(1/\sqrt{2})\,(1-2y_{2i-1}),$$

$$I_{.2i}=Q_{.2i}=-(1/\sqrt{2})\,(1-2y_{2i})\text{ for i}=1, 2, \ldots, 45 \qquad \text{[Equation 1]}$$

Here, the apparatus for transmitting through multiplexing the data frame may apply a small phase modulation scheme with respect to an SOF symbol in order to use the SOF symbol as the anchor slice, or to frame synchronize.

The frame generating unit 140 may generate the anchor slice by multiplying the SOF symbol by $e^{-j(a_k\Phi)}$. Here, $a_k$ denotes an anchor slice marker, and Φ denotes an angle having a minimum signal to noise ratio (SNR).

For example, Φ may correspond to a small angle value having a range of [π/2, π/8] based on the minimum SNR, and may be selected to be π/4. A sequence in Equation 2 may refer to the anchor slice marker.

$$a_k\{+1,+1,-1,+1,+1,-1,-1,-1,+1,+1,+1,+1,+1,-1,-1,+1,+1,-1,+1,-1,-1,+1,-1,-1,-1,-1\} \qquad \text{[Equation 2]}$$

Figure 4:
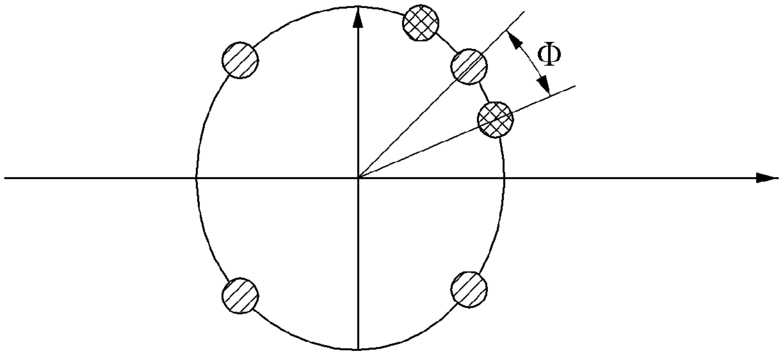
FIG. 4 is a diagram illustrating an example of a start of frame (SOF) symbol rotation for configuring an anchor slice marker according to an embodiment of the present invention.

FIG. 4 is a diagram illustrating an example of an SOF symbol rotation for configuring an anchor slice marker according to an embodiment of the present invention.

Referring to FIGS. 1 and 4, the frame generating unit 140 may generate a multiplexing super frame by rotating a super frame once per a phase rotation period. An apparatus for transmitting through multiplexing a data frame may be little influenced by a rotation of an SOF symbol because only a single super frame is rotated per an "M" number of slices. The smaller an angle of the rotation of the SOF, the less the influence by the rotation.

Although the apparatus for transmitting through multiplexing the data frame according to an embodiment of the present invention may obtain a synchronization through the following process, the apparatus is not limited thereto, and may obtain a synchronization through various methods.

The apparatus for transmitting through multiplexing the data frame may search for the SOF symbol, and perform the synchronization process of a PLframe through decoding of a total of PLheaders.

The apparatus for transmitting through multiplexing the data frame may extract an anchor slice marker through a correlation algorithm between SOF symbol data and data predetermined to be the anchor slice marker, and complete a synchronization of a super frame.

The apparatus for transmitting through multiplexing the data frame may restore data of an anchor slice to extract BBheader information, and when constant coding and modulation (CCM) information is extracted, a super frame may be configured by a PLframe, including a single slice, and when VCM/ACM information is extracted, a respective slice of a super frame may be configured by two PLframes (QPSK), three PLframes (8PSK), four PLframes (16APSK), and five PLframes (32APSK).

The apparatus for transmitting through multiplexing the data frame may count a slice between two anchor slices.

The apparatus for transmitting through multiplexing the data frame may decode SI to verify a slice including a selected service, and receive the slice including the selected service.

Also, the apparatus for transmitting through multiplexing the data frame may generate a multiplexing super frame by rotating a total phase with respect to the at least one super frame, using the frame generating unit 140.

Figure 5:
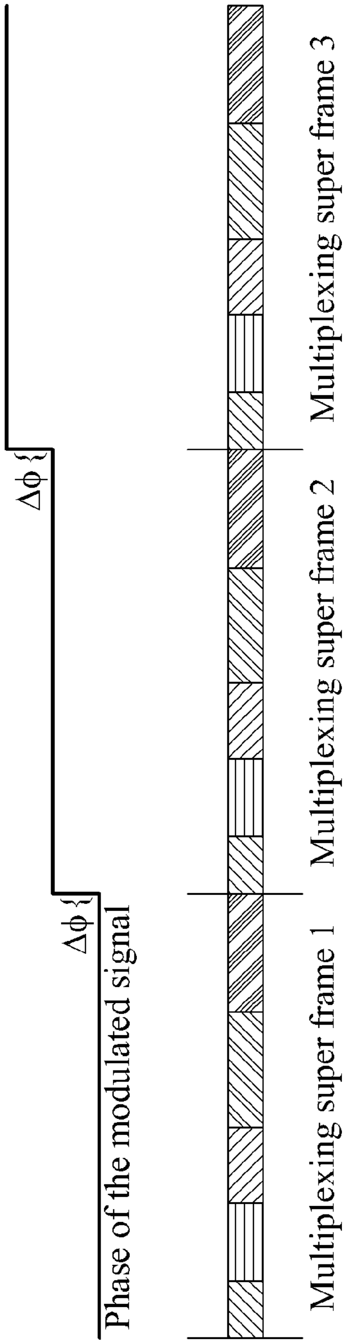
FIG. 5 is a diagram illustrating an example of a multiplexing super frame transmitting scheme based on a phase rotation according to an embodiment of the present invention.

FIG. 5 is a diagram illustrating an example of a multiplexing super frame transmitting scheme based on a phase rotation according to an embodiment of the present invention.

An apparatus for transmitting through multiplexing a data frame may transmit information by rotating a respective multiplexing super frame by a predetermined phase value in order not to influence a general receiver as shown in FIG. 5.

Figure 6:
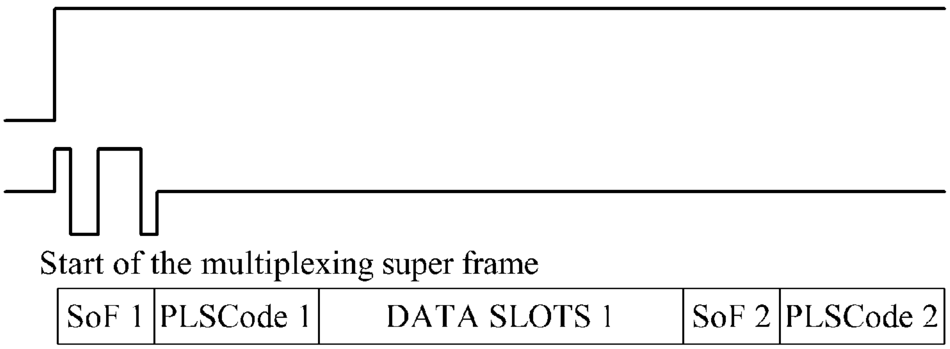
FIG. 6 is a diagram illustrating a comparison between a super frame phase change by a general receiver and a super frame phase change by an apparatus for transmitting through multiplexing a data frame according to an embodiment of the present invention.

FIG. 6 is a diagram illustrating a comparison between a super frame phase change by a general receiver and a super frame phase change by an apparatus for transmitting through multiplexing a data frame according to an embodiment of the present invention.

Referring to FIG. 6, the general receiver may perform a phase change only on an SOF symbol, as a lower phase among two phases, however, the apparatus for transmitting through multiplexing the data frame may provide a scheme for phase rotating a whole of a single super frame, as an upper phase among the two phases.

Figure 7:
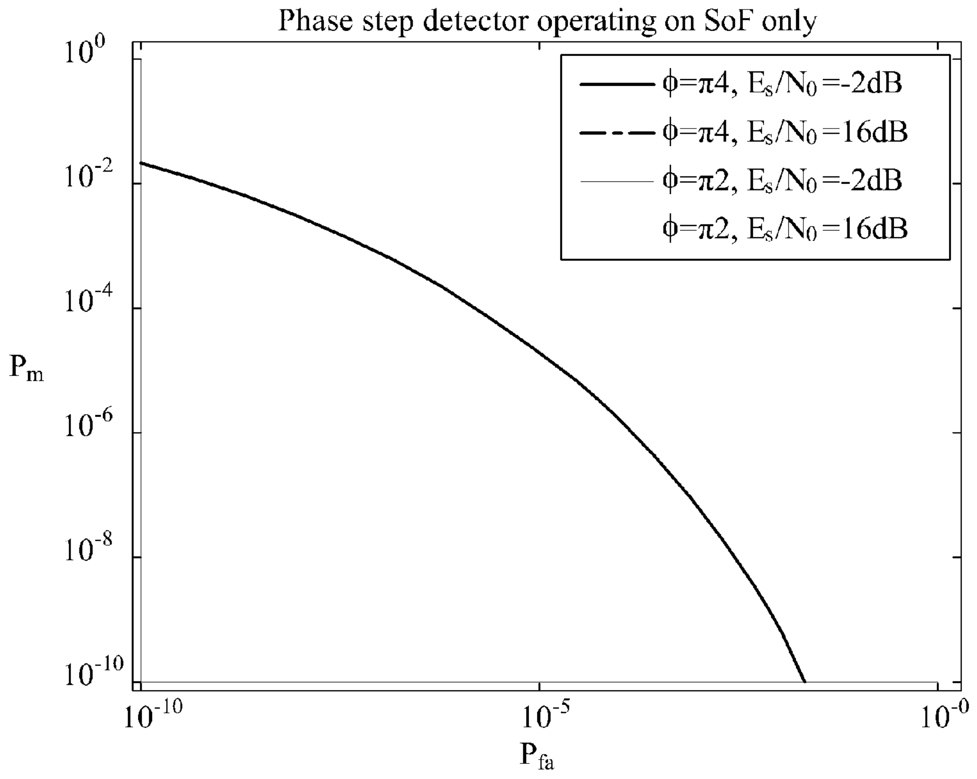
FIG. 7 is a graph illustrating a frame synchronization of a general receiver.
Figure 8:
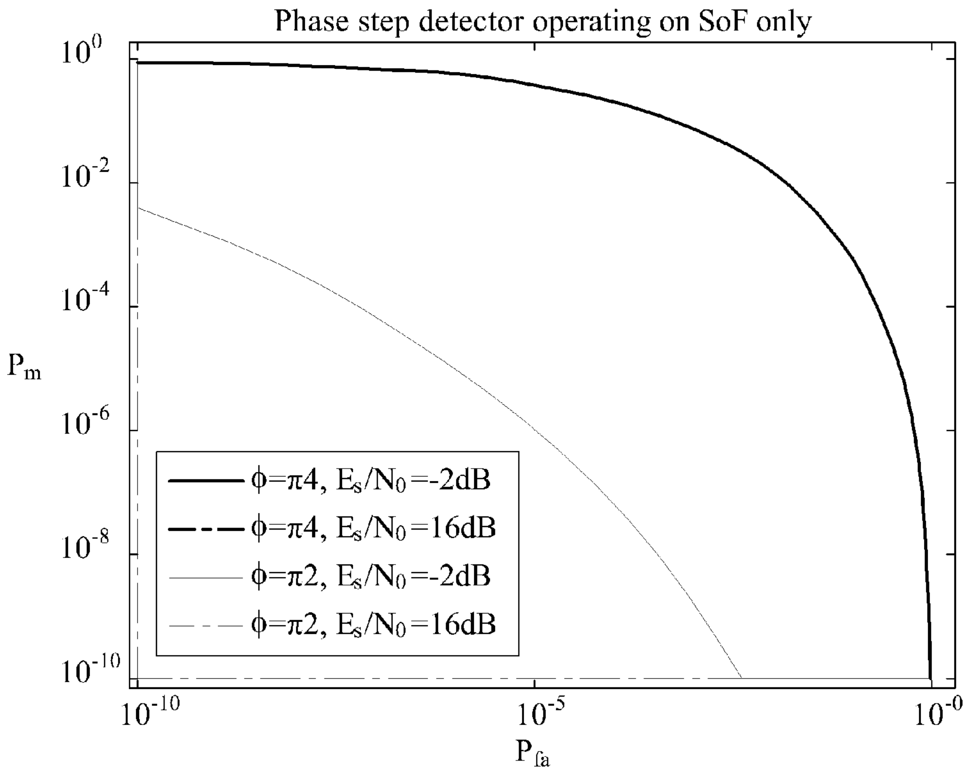
FIG. 8 is a graph illustrating a frame synchronization of an apparatus for transmitting through multiplexing a data frame according to an embodiment of the present invention.

FIG. 7 is a graph illustrating a frame synchronization of a general receiver. FIG. 8 is a graph illustrating a frame synchronization of an apparatus for transmitting through multiplexing a data frame according to an embodiment of the present invention.

As a result of comparing the graphs of FIGS. 7 and 8, the apparatus for transmitting through multiplexing the data frame may have an excellent performance compared to a synchronization performance of the general receiver, and have a low probability of failing to detect a fixed false alarm rate contrast frame.

Figure 9:
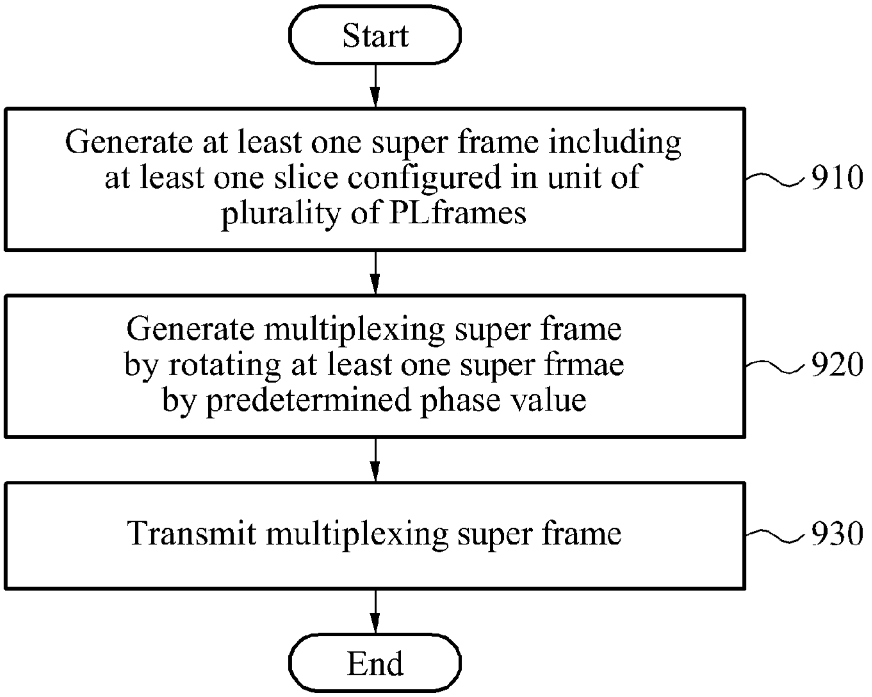
FIG. 9 is a flowchart illustrating a method for transmitting through multiplexing a data frame according to an embodiment of the present invention.

FIG. 9 is a flowchart illustrating a method for transmitting through multiplexing a data frame according to an embodiment of the present invention.

Referring to FIG. 9, in operation 910, an apparatus for transmitting through multiplexing a data frame may generate at least one super frame including at least one slice configured in a unit of a plurality of PLframes.

In operation 920, the apparatus for transmitting through multiplexing the data frame may generate a multiplexing super frame by rotating the at least one super frame by a predetermined phase value.

In operation 930, the apparatus for transmitting through multiplexing the data frame may transmit the multiplexing super frame.

The exemplary embodiments according to the present invention may be recorded in computer-readable media including program instructions to implement various operations embodied by a computer. The media may also include, alone or in combination with the program instructions, data files, data structures, and the like. The media and program instructions may be those specially designed and constructed for the purposes of the present invention, or they may be of the kind well-known and available to those having skill in the computer software arts. Examples of computer-readable media include magnetic media such as hard disks, floppy disks, and magnetic tape; optical media such as CD ROM discs and DVD; magneto-optical media such as floptical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

The invention claimed is:

1. An apparatus for transmitting through multiplexing a data frame, the apparatus comprising:

a frame generating unit to generate at least one super frame including at least one slice configured in a unit of a plurality of PLframes; and a transmitting unit to transmit the at least one super frame, wherein the frame generating unit generates a multiplexing super frame by rotating the at least one super frame by a predetermined phase value.

2. The apparatus of claim 1, further comprising:

a mapping unit to map any one of the at least one slice and service information.

3. The apparatus of claim 1, wherein at least one of the plurality of PLframes comprises:

data information about a single input stream.

4. The apparatus of claim 1, wherein the at least one super frame comprises:

an anchor slice, in a form of an initial start frame.

5. The apparatus of claim 4, wherein the frame generating unit generates the anchor slice by phase modulating a start of frame (SOF) symbol of the at least one super frame.

6. The apparatus of claim 5, wherein the frame generating unit determines a phase rotation period of the at least one super frame, based on the anchor slice.

7. The apparatus of claim 6, wherein the frame generating unit generates the multiplexing super frame by rotating the at least one super frame once per the phase rotation period.

8. The apparatus of claim 5, wherein the frame generating unit generates the anchor slice by multiplying the SOF symbol by $e^{-j(a_k \Phi)}$, wherein $a_k$ denotes an anchor slice marker, and $\Phi$ denotes an angle having a minimum signal to noise ratio (SNR).

9. The apparatus of claim 1, wherein the frame generating unit generates the multiplexing super frame by rotating a total phase with respect to the at least one super frame.

10. A method for transmitting through multiplexing a data frame, the method comprising:

generating at least one super frame including at least one slice in a unit of a plurality of PLframes;

generating a multiplexing super frame by rotating the at least one super frame by a predetermined phase value; and transmitting the multiplexing super frame.

11. The method of claim 10, further comprising:

mapping any one of the at least one slice and service information.

12. The method of claim 10, wherein at least one of the plurality of PLframes comprises:

data information about a single input stream.

13. The method of claim 10, wherein the plurality of super frames comprises:

an anchor slice, in a form of an initial start frame.

14. The method of claim 13, wherein the generating of the multiplexing super frame comprises:

generating the anchor slice by phase modulating a start of frame (SOF) symbol of the plurality of super frames.

15. The method of claim 14, wherein the generating of the multiplexing super frame comprises:

determining a phase rotation period for the at least one super frame, based on the anchor slice.

16. The method of claim 15, wherein the generating of the multiplexing super frame further comprises:

generating the multiplexing super frame by rotating the at least one super frame once per the phase rotation period.

17. The method of claim 14, wherein the generating of the multiplexing super frame further comprises:

generating the anchor slice by multiplying the SOF symbol by $e^{-j(a_k\Phi)}$, wherein $a_k$ denotes an anchor slice marker, and $\Phi$ denotes an angle having a minimum signal to noise ratio (SNR).

18. The method of claim 10, wherein the generating of the multiplexing super frame further comprises:

generating the multiplexing super frame by rotating a total phase with respect to the at least one super frame.

* * * * *